March 22, 1932. G. E. FARLEY 1,850,541
TIRE PRESSURE GAUGE
Filed Dec. 28, 1927
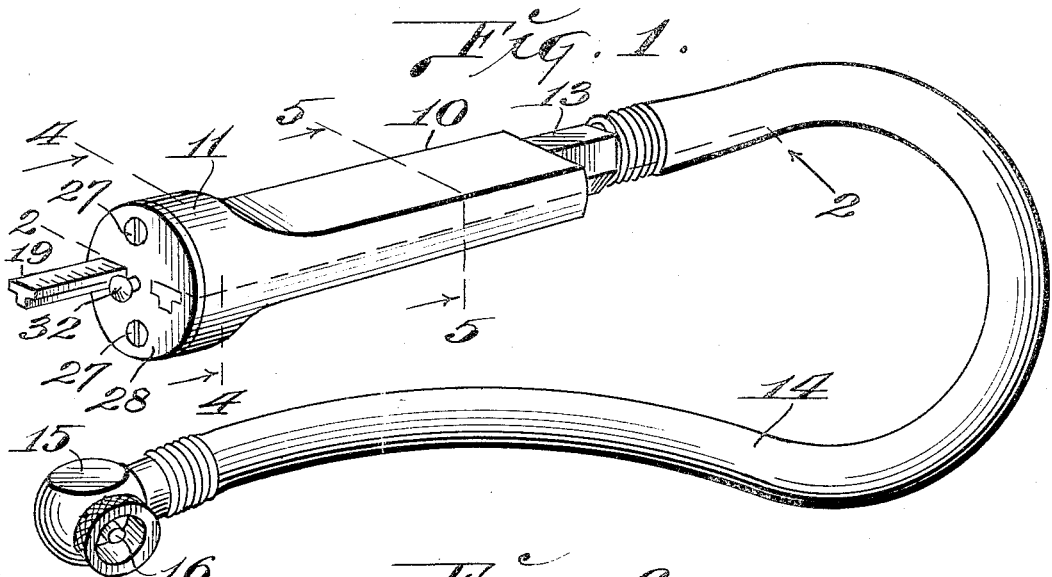
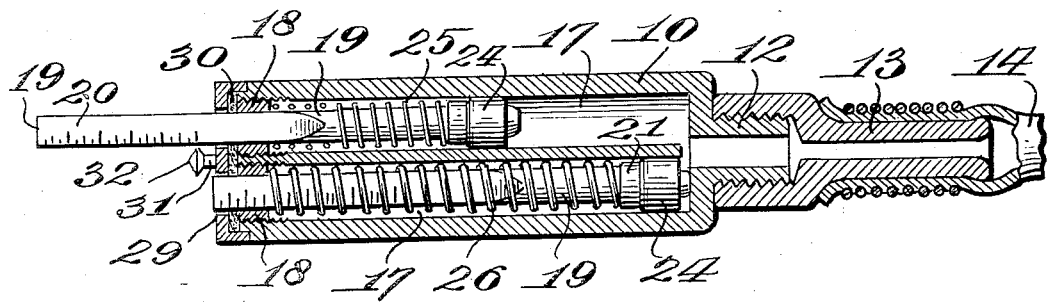
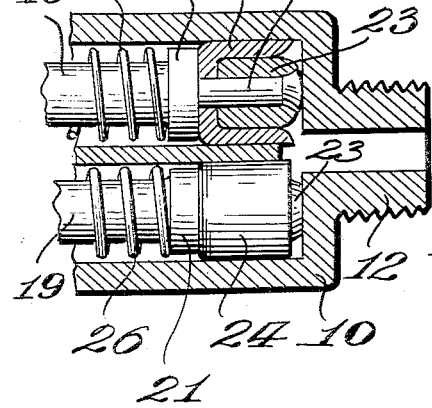
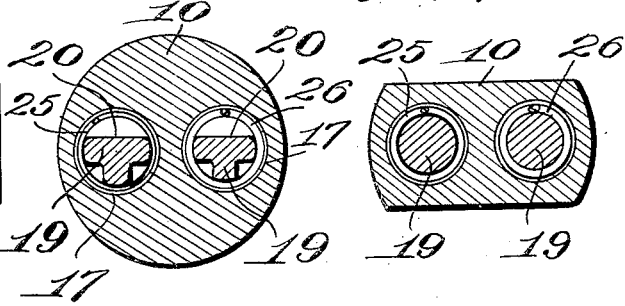
INVENTOR:—
George E. Farley.
By Martin C. Smith Atty.

Patented Mar. 22, 1932

1,850,541

UNITED STATES PATENT OFFICE

GEORGE E. FARLEY, OF SOUTH GATE, CALIFORNIA, ASSIGNOR TO SERVICE EQUIPMENT COMPANY, OF SOUTH GATE, CALIFORNIA

TIRE PRESSURE GAUGE

Application filed December 28, 1927. Serial No. 243,140.

My invention relates to a tire pressure gauge and has for its principal objects the provision of a gauge that may be conveniently utilized for accurately ascertaining the degree of fluid pressures, particularly the pressure of air in pneumatic tires;—further to provide a device of the character referred to that is relatively simple in construction, inexpensive of manufacture, and which may be conveniently employed in connection with or independently of a pneumatic tire inflating device.

A further object of my invention is to provide a tire pressure gauge that is constructed so that it will accurately indicate pressures throughout a relatively wide range without necessitating increase in the size of the body of the gauge or its operating parts, and to accomplish this desirable result I provide the gauge with two graduated scale bearing members, one of which is utilized for indicating comparatively low pressures and the other for indicating a higher range of pressures, and which scale bearing members are designed to operate in sequence.

A further object of my invention is to generally improve upon and simplify the construction of the existing forms of tire pressure gauges and to provide a gauge that has comparatively few operating parts, and which gauge is very compact, thereby enabling it to be conveniently carried in the pocket or stored in a comparatively small space.

With the foregoing and other objects in view, my invention consists in certain novel features of construction and arrangement of parts that will hereinafter be more fully described and claimed and illustrated in the accompanying drawings, in which—

Fig. 1 is a perspective view of a tire pressure gauge constructed in accordance with my invention.

Fig. 2 is an enlarged horizontal section taken on the line 2—2 of Fig. 1.

Fig. 3 is an enlarged detail section of the rear portion of the body of the gauge.

Fig. 4 is an enlarged cross section taken on the line 4—4 of Fig. 1.

Fig. 5 is an enlarged cross section taken on the line 5—5 of Fig. 1.

Referring by numerals to the accompanying drawings which illustrate a practical embodiment of my invention, 10 designates the body of the gauge, the same being preferably formed of aluminum or other relatively light weight metal, the forward portion 11 of said body being in the form of a short cylinder and the greater portion of the body being substantially rectangular in cross section.

Formed integral with the rear end of the body 10 is a short nipple or tubular member 12 that is externally threaded for the reception of a short tubular connection 13 onto which is fitted one end of a flexible tube 14, the other end of this flexible tube carries a small metal head or body 15 in which is arranged a valve stem unseating pin 16.

Formed in the body 10 is a pair of parallel bores or chambers 17 and the rear ends of these bores or chambers communicate with the opening through the nipple 12. These bores or chambers are preferably the same size and they are disposed on opposite sides of the axis of the body.

At the forward end of the body 10 the bores or chambers 17 are internally threaded for the reception of externally threaded bushings 18 and arranged to slide freely through these bushings are gauge rods 19 each provided on its outer portion with a longitudinally disposed flat face 20. The inner end of each rod 19 is provided with a circumferential flange 21 and projecting from the inner end of each rod is an axially disposed pin 22 on which is riveted or pressed a head or collar 23.

Securely clamped on stem 22 by this head or collar 23 and surrounding the latter is a cup leather washer or packing member 24 which together with the head or collar 23 functions as a piston which is moved forward by air pressure that enters the inner end of the corresponding chamber 17 through the nipple 12. Arranged on one rod 19 between the flange or collar 21 and the corresponding bushing 18 is a coil spring 25 of comparatively light tension and adapted to yieldingly resist relatively low air pressures, for instance, from 20 to 50 pounds, and arranged on the other rod between its flange or collar 21 and the corresponding bushing is a coil spring 26 of stronger tension, and which is adapted to yieldingly resist higher fluid pressures, for instance, from 50 to 100 or 150 pounds.

The members 18 in addition to serving as bushings may be screwed into the end of body 10 slight distances in order to regulate or adjust for a limited degree the tension of the springs that bear against said bushings.

Positioned on the forward end of body 10 and detachably secured thereto by screws 27 is a disk 28 provided with openings 29 for the accommodation of gauge rods 19 and interposed between this disk and the end of body 10 is a washer or thin body 30 of felt or light fibrous material that functions to prevent dust, moisture and the like from entering the chambers 17 that contain the operating parts of the gauge.

The edges of the felt washer 30 around the rods 19 function as wipers to rub and thereby clean the surfaces of the rods 19 as the same move outwardly from the body 10 under air pressure or inwardly under the action of the springs 25 and 26.

The flat face 20 of the rod 19 with which is associated the spring 25 of relatively light tension is provided with a graduated scale that is adapted to register comparatively low pressures for instance, from zero to 50 pounds and the flat face of the other rod is provided with a graduated scale that is adapted to indicate or register pressures through a higher range, for instance, from 50 to 100 or 150 pounds. Obviously the two graduated scales may have sub-divisions to indicate 1, 2½, 5 or 10 pounds.

Formed integral with or fixed to the disk 28 and projecting outwardly from the center thereof is a short stud 31 and formed on the outer end thereof is a disk 32 having a sharp edge, and which disk serves as a point or finger whereby the grauated scales on the flat faces of the rods 19 may be accurately observed and read.

The sharp edge of the disk 32 lies immediately adjacent to the inner edges of the flat faces 20 on rods 19, thereby enabling the graduated scales to be conveniently read when the rods are forced outward under air pressure.

In the use of my improved pressure gauge head 15 is applied to the end of a pneumatic tire valve and as the pin 16 unseats the stem of said valve air from the tire under pressure will pass through flexible tube 14 and pass through tubular members 13 and 12 into the inner ends of the chambers 17 and if the pressure of the air thus entering the device is relatively low or within the range of the pressures indicated on the rod 19 having the spring of comparatively light tension then the air pressure acting on the cup leather washer at the inner end of this particular rod will force the same outward, thereby compressing the spring 25 and the flat portion of said rod will be projected through the corresponding opening in disk 28, and when said rod comes to a stop a reading of the air pressure may be readily taken by observing the graduated mark on the scale that is directly opposite the edge of disk 32. The outward travel of the gauge rods 19 within their respective chambers is limited by the engagement of the shoulders thereon against the inner faces of the bushings 18 and which shoulders are formed between the inner ends of the flat faces 20 on said rods and the cylindrical rear or inner portions of said rods.

In the event that the air pressure in the tire that is being tested is greater than the range that is taken care of by the gauge rod 19 having the spring of comparatively light tension, then at the termination of the outer movement of the rod having the lighter spring the rod having the heavier spring will be moved outward and a reading of the pressure may be obtained by noting the mark on the graduated scale of the rod having the heavier spring, that is directly opposite the edge of the disk 32.

In this connection it will be understood that the numbers on the graduated scale on the rod having the heavier spring are such as to indicate the pressures through a higher range, for instance, from 50 to 100 or 150 pounds and that after the gauge rod having the lighter spring has been moved outward to its limit of movement then higher pressures are effective in moving the rod having the spring of higher tension, outward. The gauge rod having the heavier spring 26 may move outward a slight distance before the termination of the extreme outward movement of the gauge rod having the lighter spring but such movement of the rod having the heavier spring will not be sufficient to be read on its scale in combination with the pointer 32.

Thus it is possible with a gauge body of comparatively short length to obtain an accurate reading of air pressures throughout a comparatively wide range, for instance, from zero up to 150 or 200 pounds; such advantage being gained through the use of a pair of independently operating gauge rods that have associated therewith springs of different tensions.

The cup leather washers that are carried by the inner ends of the gauge rods are securely fastened to said rods by the collars or heads 23 and these parts function to produce ideal pistons for the gauge rods and the construction of which pistons is such as to prevent leakage of fluid pressures past said pistons.

It will be noted that I have shown the outer portions of the bodies of the gauge rods 19 as being substantially T-shape in cross section and this is done in order to prevent the gauge rods from rotating during their reciprocating movements. Obviously, any suitable means may be provided to prevent the gauge rods from rotating, for instance, said rods may be made non-circular in cross section with corresponding openings in the disc 28 or a feather or key arrangement may be provided between said gauge rods and said disc.

By thus preventing rotation of the gauge rods, the flat faces 20, thereof bearing the graduated scales, are always maintained in the same plane and in position to be easily observed and read.

Thus, it will be seen that I have provided a tire pressure gauge that is relatively simple in construction, inexpensive of manufacture, positive and accurate in operation and very effective in performing the functions for which it is intended.

It will be understood that minor changes in the size, form and construction of the various parts of my improved tire pressure gauge may be made and substituted for those herein shown and described without departing from the spirit of my invention, the scope of which is set forth in the appended claims.

I claim as my invention,—

1. In a tire pressure gauge, a gauge body provided with communicating chambers, a plurality of independently operating pressure gauging members arranged for reciprocation within said chambers, each gauging member bearing a graduated scale that is brought into view as the gauging member is projected from said gauge body, and springs of different tension associated with the respective gauge members.

2. In a tire pressure gauge, a gauge body provided with communicating chambers, a plurality of pressure gauging members arranged for independent reciprocation within said chambers, a common pointer for said gauge members, and springs of different tensions associated with the respective gauge members.

3. In a tire pressure gauge, a body having a plurality of chambers, gauge members arranged for independent reciprocating movement within said chambers and each provided with a scale parallel to its path of movement, springs of different tensions associated with the respective gauge members for resisting outward movement thereof, and a common pointer for said scales.

4. In a tire pressure gauge, a body having a plurality of chambers, a gauge member arranged for operation within each chamber, each gauge member being provided with a flat face on which is formed a graduated scale, a spring associated with each gauge member for resisting its outward movement, said springs being of different tensions, and a common pointer for facilitating the reading of the graduated scales on said gauge members.

5. In a tire pressure gauge, a body having a plurality of separate chambers, said chambers having a common fluid pressure inlet, gauge members arranged for reciprocation within said chambers, springs of different tension associated with said gauge members for resisting their outward movement, and each gauge member bearing a graduated scale that is exposed to view as the gauge member is projected from the gauge body.

6. In a gauge for indicating fluid pressures throughout a relatively wide range, a gauge body provided with chambers communicating with a common source of fluid pressure, a plurality of definitely tensioned spring-held pressure gauging members arranged for independent sequential movement relative to said chambers for indicating different degrees of pressure throughout different predetermined ranges, an indicator for designating the degree of movement of said gauging members, and springs of different tension associated with the respective gauging members for resisting the movement of said members under the influence of said fluid pressure.

7. In a gauge for indicating fluid pressures comprising a gauge body provided with a plurality of chambers communicating with a common source of fluid pressure, a plurality of pressure gauging members in said chambers, means for constraining the same to move sequentially, and means for designating the degree of movement of said members during their sequential movements.

8. In a gauge for indicating fluid pressures comprising a body provided with a plurality of chambers, said chambers being in communication with each other, a plurality of gauging members arranged for movement relative to the chambers, means associated with said gauging members for constraining the same to move sequentially in response to different ranges of pressures, and means for designating the degree of movement of said gauge members.

9. A gauge for indicating tire pressures comprising a flexible tube, a chuck associated with one end thereof adapted to be applied to the tire valve for communicating its pressure to said tube, a gauge associated with the other end of said tube, said gauge comprising a plurality of chambers, said chambers being in communication with each other, a plurality of gauging members arranged therein, means associated with said gauging members for constraining the same to have independent sequential movement responsive to different ranges of pressures and means for indicating the degrees of movements of said pressure members throughout said ranges.

10. In a gauge for indicating fluid pressures throughout a relatively wide range, a gauge body provided with chambers communicating with a common source of fluid pressure, a plurality of definitely tensioned spring-held pressure gauging members arranged for independent sequential movement parallel to the longitudinal axis of said chambers, springs of different tension associated with the different gauging members for resisting displacement of said gauging members from their datum positions, and means for designating the degree of displacement of said members from their datum positions.

In testimony whereof I affix my signature.

GEORGE E. FARLEY.